US009435882B2

United States Patent
Martone et al.

(10) Patent No.: US 9,435,882 B2
(45) Date of Patent: Sep. 6, 2016

(54) METHOD AND APPARATUS FOR COGNITIVE NONLINEAR RADAR

(71) Applicant: U.S. Army Research Laboratory ATTN: RDRL-LOC-I, Adelphi, MD (US)

(72) Inventors: Anthony F. Martone, Ellicott City, MD (US); David M. McNamara, Frederick, MD (US); Gregory J. Mazzaro, Charleston, SC (US); Abigail S. Hedden, Vienna, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 430 days.

(21) Appl. No.: 14/010,580

(22) Filed: Aug. 27, 2013

(65) Prior Publication Data

US 2016/0033622 A1 Feb. 4, 2016

Related U.S. Application Data

(60) Provisional application No. 61/699,389, filed on Sep. 11, 2012.

(51) Int. Cl.
  *G01S 13/00* (2006.01)
  *G01S 13/04* (2006.01)
  *G01S 7/02* (2006.01)
  *G01S 7/28* (2006.01)
  *G01S 7/41* (2006.01)

(52) U.S. Cl.
  CPC .............. *G01S 13/04* (2013.01); *G01S 7/021* (2013.01); *G01S 7/023* (2013.01); *G01S 7/28* (2013.01); *G01S 7/412* (2013.01); *G01S 7/414* (2013.01)

(58) Field of Classification Search
  CPC ........ G01S 13/04; G01S 7/021; G01S 7/412; H04B 1/1027; H04W 16/14
  USPC .............................................. 342/27, 44, 193
  See application file for complete search history.

(56) References Cited

U.S. PATENT DOCUMENTS

| 3,732,567 A | 5/1973 | Low et al. |
| 4,053,891 A | 10/1977 | Opitz |
| 6,765,527 B2 | 7/2004 | Jablonski et al. |

(Continued)

OTHER PUBLICATIONS

E. Zell, G. Leus, E. Larsson, V. Poor, "Spectrum Sensing for Cognitive Radio", IEEE Signal Processing Magazine, vol. 29, No. 3, pp. 101-116, May 2012.

(Continued)

*Primary Examiner* — Timothy A Brainard
(74) *Attorney, Agent, or Firm* — Alan I. Kalb

(57) ABSTRACT

A method and apparatus for cognitive non-linear radar processing comprising identifying one or more frequency bands of interest, passively scanning, using a non-linear radar (NR), the one or more frequency bands of interest to determine whether interference signals are occupying the one or more bands, transmitting radar waveforms and receiving radar waveform responses at one or more frequency bands determined to be free of interference, determining a likelihood of a target being present or not based on whether the received waveform responses match stored waveform responses for non-linear targets, and modifying waveform parameters of the transmitted radar waveform when the received waveform responses match the stored waveform responses, so as to transmit a modified radar waveform.

22 Claims, 4 Drawing Sheets

(56) References Cited

U.S. PATENT DOCUMENTS

| | | | |
|---|---|---|---|
| 6,897,777 | B2 | 5/2005 | Holmes et al. |
| 7,680,599 | B1 | 3/2010 | Steadman et al. |
| 7,830,299 | B2 | 11/2010 | Steele et al. |
| 7,864,107 | B1 | 1/2011 | Lehtola |
| 7,987,068 | B2 | 7/2011 | Schultz et al. |
| 8,054,212 | B1 | 11/2011 | Holly et al. |
| 8,063,813 | B1 | 11/2011 | Keller |
| 8,131,239 | B1 | 3/2012 | Walker et al. |
| 2008/0057869 | A1* | 3/2008 | Strong .............. H04L 27/2608 455/63.1 |
| 2011/0084871 | A1 | 4/2011 | Haykin et al. |

OTHER PUBLICATIONS

A. Konaka, D. Coitb, A. Smith, "Multi-Objective Optimization Using Genetic Algorithms: A Tutorial", Reliability Engineering and System Safety, vol. 91, No. 9, pp. 992-1007, Sep. 2006.

C.M. Fonseca, P.J. Fleming, "Genetic Algorithms for Multi-Objective Optimization: Formulation, Discussion and Generalization", in Proceedings the 5th International Conference on Genetic Algorithms, San Francisco, CA, pp. 416-423, 2006.

C. Rieser, T. Rondeau, C. Boston, T. Gallagher, "Cognitive Radio Testbed: Further Details and Testing of a Distributed Genetic Algorithm Based Cognitive Engine for Programmable Radios", in Proceedings of the 2004 IEEE Military Communications Conference, vol. 3, pp. 1437-1443, Nov. 2004.

T. Rondeau, B. Le, D. Maldonado, D. Scaperoth, C. Bostian, "Cognitive Radio Formulation and Implementation" in Proceedings of the 1st International Conference on Cognitive Radio Oriented Wireless Networks and Communications, pp. 1-10, Jun. 8-10, 2006.

R. Harger, "Harmonic Radar Systems for Near-Ground In-Foliage Nonlinear Scatterers", IEEE Transactions on Aerospace and Electronic Systems, vol. 12, No. 2, pp. 230-245, Mar. 1976.

C. Fazi, F. Crowns and M. Ressler, "Design Considerations for Nonlinear Radar", Sensors and Electron Devices Directorate, ARL: ARL-TR-5684, Sep. 2011.

M.A. Flemming, F.H. Mullins, A. Watson, "Harmonic Radar Detection Systems", in Proceedings of the International IEEE Radar-77 Conference, London, pp. 552-555, Oct. 1977.

J. Shefer, R.J. Klensch, "Harmonic Radar Helps Autos Avoid Collisions," IEEE Spectrum, vol. 10, No. 5, pp. 38-45, May 1973.

V. Viikari, J. Saebboe, S. Cheng, M. Kantanen, M. Al-Nuaimi, T. Varpula, A. Lamminen, P. Hallbjorner, A. Alastalo, T. Mattila, H. Seppa, P. Pursula, A. Rydberg, "Technical Solutions for Automotive Intermodulation Radar for Detecting Vulnerable Road Users", in Proceedings of IEEE 69th Vehicular Technology Conference Spring (VTC2009-Spring), Barcelona, Spain, Apr. 26-29, 2009.

A.F. Martorie, A.K. Mikkilineni, E.J. Delp, "Forensics of Things", in Proceedings of the IEEE Southwest Syrrtposium on Image Analysis and Interpretation, pp. 149-152, 2006.

M.E. O'Neal, D.A. Landis, E. Rothwell, L. Kempel, D. Reinhard, "Tracking Insects with Harmonic Radar: A Case Study", American Entomologist, Winter 2004, pp. 212-218.

G.L. Charvat, E.J. Rothwell, L.C. Kempel, "Harmonic Radar Tag Measurement and Characterization", IEEE Antennas and Propagation Society Int. Symp., Jun. 2003, vol. 2, pp. 696-699.

J.L. Osborne, S.J. Clark, R.J. Morris, I.H. Williams, J.R Riley, A.D. Smith, D.R. Reynolds, A.S. Edwards, "A Landscape-Scale Study of Bumble Bee Foraging Range and Constancy, Using Harmonic Radar", Journal of Applied Ecology, vol. 36, No. 4, pp. 519-533, 1999.

B. Widrow, P.E. Mantey, L.J. Griffiths, B.B. Goode, "Adaptive Antenna Systems", in Proceedings of the IEEE, vol. 55, No. 12. pp. 2143-2159, Dec. 1967.

L.E. Brennan, L.S. Reed, "Theory of Adaptive Radar", IEEE Transact on Aerospace and Electronic Systems, vol. AES-9, No. 2, pp. 237-252, Mar. 1973.

S. Applebaum, "Adaptive Arrays", IEEE Transactions on Antennas and Propagation, vol. 24, No. 5, pp. 585-598, Sep. 1976.

W.L. Melvin, "A STAP Overview", IEEE Aerospace and Electronic Systems Magazine, vol. 19, No. 1, pp. 19-35, Jan. 2004.

M.C. Wicks, M. Rangaswam R. Adve, T.B. Hale, "Space-time Adaptive Processing: A Knowledge-Based Perspective for Airborne Radar", IEEE Signal Processing Magazine, vol. 23, No. 1, pp. 51-65, Jan. 2006.

S. Haykin, "Cognitive Radar: A Way of the Future", IEEE Signal Processing Magazine, vol. 23, No. 1, pp. 30-40, Jan. 2006.

G.T. Capraro, A. Farina, H. Griffiths, M.C. Wicks, "Knowledge-Based Radar Signal and Data Processing: A Tutorial Review", IEEE Signal Processing Magazine, vol. 23, No. 1. pp. 18-29, Jan. 2006.

J.R. Guerci, E.J. Baranoski, "Knowledge-Aided Adaptive Radar DARPA: An Overview", IEEE Signal Processing Magazine, vol. 23, No. 1, pp. 41-50, Jan. 2006.

S. Haykin, Y. Xue, T.N. Davidson, "Optimal Waveform Design for Cognitive Radar", in Proceeding the 1008 Asilomar Conference on Signals, Systems and Computers, pp. 3-7, Oct. 26-29, 2008.

M.R. Bell, "Information Theory and Radar Waveform Design", IEEE Transactions on Information Technology, vol. 39, pp. 1578-1597, Sep. 1993.

R. Qiu, N. Guo, H. Li, Z. Wu, V. Chakravarthy, Y. Song, Z. Hu, P. Zhang, Z. Chen, "A Unified Framework for Cognitive Radio, Cognitive Radar, and Electronic Warfare-Tutorial, Theory, and Multi-GHz Wideband Testbed", Sensors 2009, vol. 9, No. 8. pp. 6530, 6603, Apr. 2009.

T. Rondeau, C. Rieser, T. Gallagher, C. Bostian, "Online Modeling of Wireless Channels with Hidden Markov Models and Channel Impulse Responses for Cognitive Radios", 2004 IEEE MTT-S International Microwave Symposium Digest, vol. 2, pp. 739-742, Jun. 2004.

R. Romero, N. Goodman, "Adaptive Beam Steering for Search-and-Track Application with Cognitive Radar Network", in Proceedings of the 2011 IEEE Radar Conference (RADAR), pp. 1091-1095, May 23-27, 2011.

\* cited by examiner

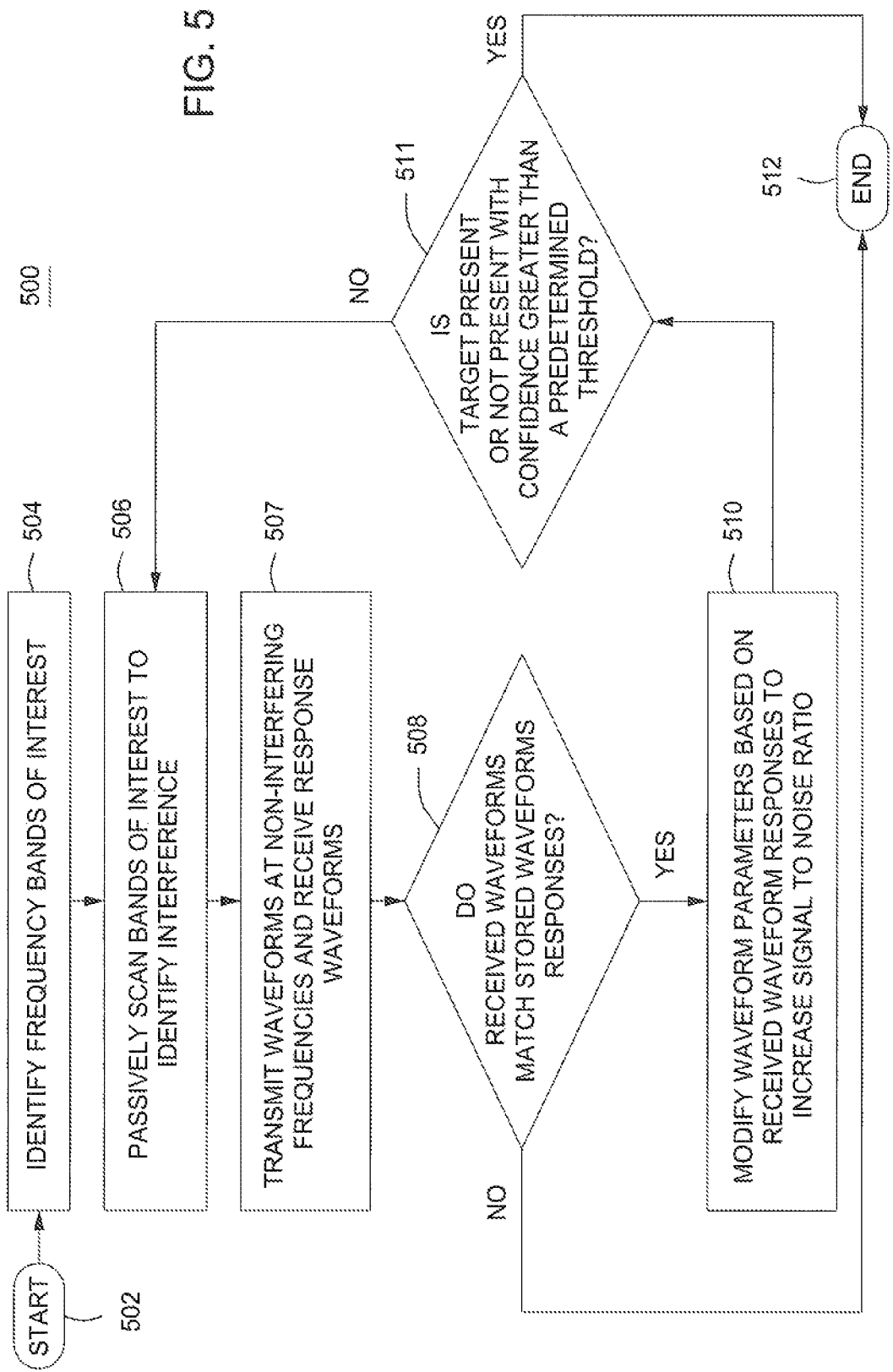

METHOD AND APPARATUS FOR COGNITIVE NONLINEAR RADAR

GOVERNMENT INTEREST

Governmental Interest—The invention described herein may be manufactured, used and licensed by or for the U.S. Government.

FIELD OF INVENTION

Embodiments of the present invention generally relate to target detection using radar and, more particularly to a method and apparatus for cognitive nonlinear radar.

BACKGROUND OF THE INVENTION

Ground-based and airborne radar systems are often used to detect objects in a specified area by using radio waves to determine the range, altitude, direction and speed of the objects. These radar systems can be used to detect aircrafts, automobiles, guided missiles, terrain or the like. In a transmission mode of operation, radar systems emit radio waves or microwaves, which are reflected from any objects within their path of travel. In a reception mode of operation, the radar systems detect the energy of the reflected waves for determining the range, altitude, direction and speed of targets. However, in environments cluttered with electromagnetic (EM) activity, distinguishing targets of genuine interest from electromagnetic clutter becomes difficult.

Nonlinear radar (NR) addresses some of these problems when monitoring RF activity in a particular area or application. For example, NR produces response frequencies from nonlinear targets (e.g., electronics or metal objects), that are different from those transmitted by linear radar, thereby allowing a way to distinguish natural clutter from the response of nonlinear targets. NR has also been used in military operations to detect concealed weapons, electronics and other man-made objects, in addition to device detection for FCC part 15 compliance.

NR is used in insect tracking, where insects are fitted with nonlinear tags and tracked to study movement and foraging behavior. However, NR still falls short in adapting to an increasingly cluttered EM environment, or other radar, communication and electronic systems which required interference-free operation.

Therefore there is a need in the art for implementing NR to adapt to and co-exist in the EM environment.

BRIEF SUMMARY OF THE INVENTION

Embodiments of the present invention relate to a method for cognitive non-linear radar processing comprising identifying one or more frequency bands of interest, passively scanning, using a non-linear radar (NR), the one or more frequency bands of interest to determine whether interference signals are occupying the one or more bands, transmitting radar waveforms and receiving radar waveform responses at one or more frequency bands determined to be free of interference signals, determining whether the received waveform responses match stored waveform responses for non-linear targets, and modifying waveform parameters of the transmitted radar waveform when the received waveform responses match the stored waveform responses, so as to transmit a modified radar waveform.

Embodiments of the present invention further relate to an apparatus for cognitive non-linear radar processing comprising one or more passive receivers to scan one or more frequency bands of interest to determine whether interference signals are occupying the one or more bands of interest, a radar transmitter to transmit radar waveforms and receive radar waveform responses at one or more frequency bands free of interference; and a cognitive processor that determines whether the received waveform responses match stored waveform responses for non-linear targets and modifies waveform parameters of the transmitted radar waveform when the responses match stored responses so as to transmit a modified waveform.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 depicts a method for non-linear cognitive radar processing, in accordance with exemplary embodiments of the present invention.

DETAILED DESCRIPTION OF THE INVENTION

The cognitive non-linear radar (CNR) processing system utilizes a narrowband, non-linear radar target detection methodology that adapts to the radio frequency (RF) environment of a detection area by intelligently selecting waveform parameters using machine learning algorithms. The machine learning algorithms optimize radar waveform parameters based on EM interference, the likelihood of target detection and classification, and permissible transmit frequencies.

The system first passively scans the environment for RF interference (no "radar" operation). The spectrum sensing sub-system and the "brain", or optimizer, then determines the "best" frequencies that the radar can transmit and receive at. The passive scanning is disengaged and the radar then transmits and receives. The passive scanning is re-engaged while the received radar signal is processed for a target. The new passive scan and the results of processed radar signal are sent to the optimizer that determines the next best waveform. This process reiterates until the likelihood of a target (very likely, or not very likely) is determined. This process is described in further detail below.

Figure 1:
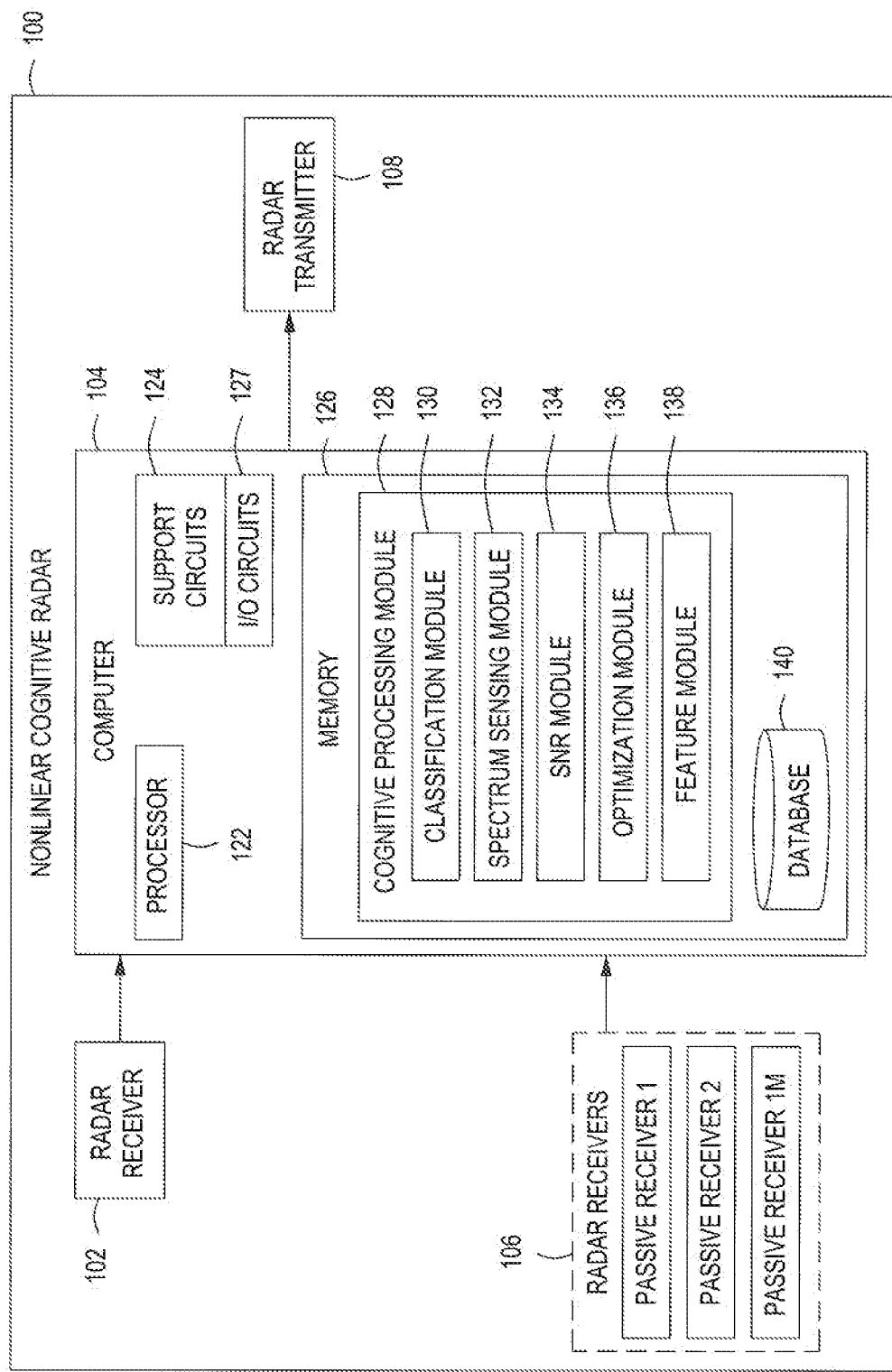
FIG. 1 depicts a cognitive non-linear radar apparatus in accordance with exemplary embodiments of the present invention.

FIG. 1 depicts a cognitive non-linear radar (NCR) apparatus 100 in accordance with exemplary embodiments of the present invention. The apparatus 100 comprises a radar receiver 102, a computer 104, one or more passive radar spectrum receivers 106, and a radar transmitter 108.

The radar receiver 102 and the passive receivers 106 are coupled as input to the computer 104. The transmitter 108 determines transmission frequency bands based on processing performed by the computer 104. The passive receivers 106 scan a predetermined RF band of interest and sub-bands within the RF band. Those of ordinary skill in the art would recognize that the predetermined sub-bands of interest are fine-tuned for specific applications. In some embodiments, the sub-bands may be based, for example, on input data from the computer 102, or from externally controlled information such as manually input information or the like.

The passive receivers 106 passively sense a spectrum of the RF environment to detect electromagnetic (EM) interference. In some embodiments, multiple passive receivers are implemented to measure multiple bands/channels of interest simultaneously. Multiple receivers may also reduce the time required to measure multiple frequency bands of interest. The signals received by passive receivers 106 are then coupled to the computer 104 for applying spectrum sensing techniques for processing passive measurements for noise, interference, and RF signals operating in the RF environment in order to transmit radar waveforms and receive radar waveform responses at one or more frequency bands determined to be free of interference. The passive receivers 1 . . . M supply the optimization module 136 with interference locations so the radar transmitter 108 and the radar receiver 102 can avoid those frequencies.

The computer 104 identifies frequency bands outside of, and therefore free of the interference, noise and other signals. Subsequently, the computer controls the receiver 102 and the transmitter 108 to receive and transmit previously stored waveforms in the identified frequency bands until the presence or absence of a nonlinear target is determined with high confidence, i.e., the cost of the transmission has been reduced below a predetermined threshold.

The computer 104 comprises a processor 122, various support circuits 124, and memory 126. The processor 122 may include one or more microprocessors known in the art. The support circuits 124 for the processor 122 include conventional cache, power supplies, clock circuits, data registers, I/O interface 127, and the like. The I/O interface 127 may be directly coupled to the memory 126 or coupled through the support circuits 124. The I/O interface 127 may also be configured for communication with input devices and/or output devices such as network devices, various storage devices, mouse, keyboard, display, video and audio sensors, IMU, RF receivers and RF transmitters or the like.

The memory 126, or a computer readable medium, stores non-transient processor-executable instructions and/or data that may be executed by and/or used by the processor 122. These processor-executable instructions may comprise firmware, software, and the like, or some combination thereof. Modules having processor-executable instructions that are stored in the memory 126 comprise a cognitive processing module 128 and a database 140.

As described below, in an exemplary embodiment, the cognitive processing module 128 comprises a classification module 130, a spectrum sensing module 132. an SNR module 134, a parameter module 136 and a feature module 138. The computer 104 may be programmed with one or more operating systems, which may include OS/2, Java Virtual Machine, Linux, SOLARIS, UNIX, HPUX, AIX, WINDOWS, IOS, and ANDROID among other known platforms. According to some embodiments, the computer 104 may be remotely coupled to the radar receiver 102, the passive receivers 106 and the transmitter 108 through a network. In other embodiments, the computer 104 is coupled to the receivers and transmitters through a wired network, or directly coupled through other means.

The memory 126 may include one or more of the following random access memory, read only memory, magneto-resistive read/write memory, optical read/write memory, cache memory, magnetic read/write memory, and the like, as well as signal bearing media as described below.

According to exemplary embodiments, once the passive radar receivers 106 scan the RF spectrum for receiving noise and interference signals in the environment, these received signals are processed by the cognitive processing module 128. The spectrum sensing module 132 processes the received signals from the passive receivers 106 for measuring noise, interference, and RF signals operating in the RF environment so that the radar transmitter 108 and receiver 102 can operate in bands that are outside of bands that include these preexisting signals.

The optimization module 136 accesses the database 140 to retrieve particular waveform responses of targets of interest that may be in the environment. The retrieved waveforms are transmitted by the radar transmitter 108. The radar receiver 102 measures the RF environment in response to the transmitted waveform. Potential target information, or features, is extracted from the received signal by the feature module 138. The signal to noise ratio (SNR) module 134 estimates the signal to noise ratio of the received signal using the extracted features from the feature module 138 and the received interference and noise from the passive receivers 106.

The classification module 132 performs target detection and classification using the signal produced from the SNR module 134, along with a priori target information, such as the amplitude of the harmonics generated by the target, in order to detect and classify targets of interest. The parameters for the transmitted waveform (i.e. amplitude, frequency, phase, modulation, etc) are optimized by the optimization module 136 based on target detection likelihood, noise and interference power levels, and permissible transmit frequencies (as specified by the database 140).

The computer 104 then selects a waveform and transmits the waveform via the radar transmitter 108. Modification of the waveform parameters by the optimization module 136 and transmission of modified waveforms by the transmitter 108 is then reiterated until the presence or absence of a nonlinear target is determined with a predetermined level of confidence. Those of ordinary skill in the art will recognize that the predetermined level of confidence is determined according to the specific application. Varied levels of confidence may be considered acceptable in various applications and those of ordinary skill in the art will be aware of the confidence needed. The optimization module 136 also processes an estimated power spectrum of the received signals to identify the frequencies of interference and noise at low power levels. The estimated power spectrum is used (in part) to select the transmit frequency for the next iteration.

Figure 2:
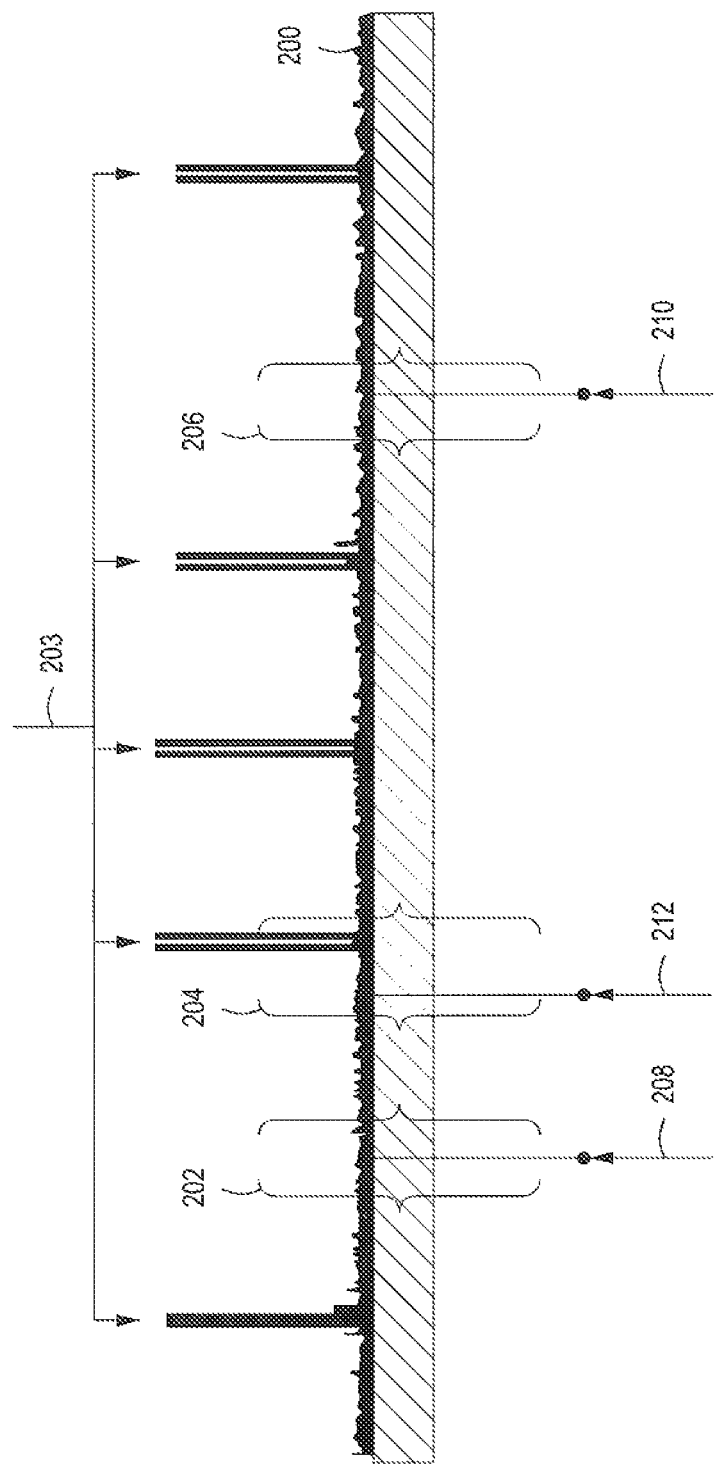
FIG. 2 depicts an RF frequency band of interest and sub-bands of interest, in accordance with exemplary embodiments of the present invention.

FIG. 2 depicts an RF frequency band of interest, and sub-bands of interest in accordance with exemplary embodiments of the present invention. The apparatus 100 utilizes a frequency selective approach to exploit the nonlinear properties of the target of interest (TOI). According to some embodiments of the present invention, database 140 of FIG. 1 is used to identify a frequency band 200 and sub-bands of interest 202, 204 and 206 based on a priori target information which indicates the areas of spectrum 200 inside of which a target is likely to respond to an RF transmission. The database 140 is also used to access known RF system waveform types thereby allowing the CNR to avoid interfering with other RF systems and being interfered with by other RF systems.

The RF environment is passively scanned for noise, RF interference, and known RF system waveforms, revealing signals 203 which are considered interference signals. Radar waveform parameters are then selected based on RE interference and noise power levels of the interference signals revealed during from the passive scan, to develop potential transmitter and receiver frequencies, for example the frequencies specified at points 208, 212 and 210. Both transmitter and receiver frequencies are considered since the nonlinear target produces frequencies different from those transmitted by the radar transmitter 108. Radar waveform parameters are also selected based on a priori target information (provided by database 140) by the optimization module 136. Selection of the radar waveform parameters is performed by adaptive algorithms, specifically a genetic algorithm, designed to solve a multi-objective optimization problem, as described in further detail below, with respect to FIG. 4.

A radar probe signal 208 is then transmitted so as to illuminate the environment and a radar response is received by radar receiver 102 and measured by computer 104. The measured radar response is then processed for a nonlinear response by the cognitive processing module 128 indicating the presence or absences of a TOI. New radar waveform parameters are selected for the next iteration based on a passive measure of RF interference and noise, a priori target and database information from database 140, and the likelihood of there being a TOI based on the previous iteration. Therefore, for a given iteration, the frequency of the new radar waveform can change to a new sub-band, for example, the frequency indicated at 210 in sub-band 206 to verify the TOI.

Figure 3:
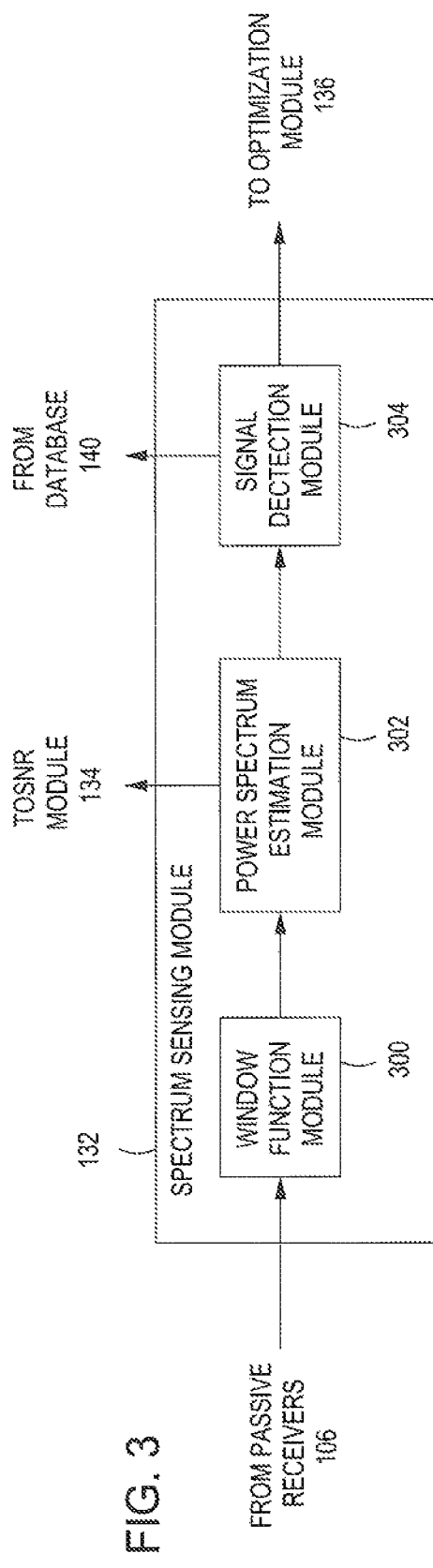
FIG. 3 is a more detailed depiction of the spectrum sensing module of FIG. 1, in accordance with exemplary embodiments of the present invention.

FIG. 3 is a more detailed depiction of the spectrum sensing module 132 of the computer 104 in accordance with exemplary embodiments of the present invention. The spectrum sensing module 132 is used to estimate the power spectrum from the finite duration data stream provided by the passive spectrum receivers 106. The passive spectrum receivers 106, after analog to digital conversion of the received signals, provide a digitized data stream of information. The spectrum sensing module 132 comprises a window function module 300 for reducing spectral leakage, or sidelobes, generated due to a finite observation window. The power spectrum estimation module 302 estimates the power spectrum efficiently using various algorithms. According to one embodiment, a Fast Fourier transform (FFT) is used to estimate the power spectrum.

The power spectrum estimate generated by the power spectrum estimation module 302 is then used in conjunction with features extracted by the classification module 130 from the radar receiver information to estimate SNR using the SNR module 134 (shown in FIG. 1) for target detection and classification. Finally, the signal detection module 304 detects potential communication and other RF signals operating in the RF environment. The signal detection module 304 accesses the database 140 for known RF system waveform types. The output of the signal detection module 304 couples to the optimization module 136 (as shown in FIG. 1) to consider potential communication and other RF signals to avoid interfering with RF systems by modifying waveform parameters of the transmitted signal.

Figure 4:
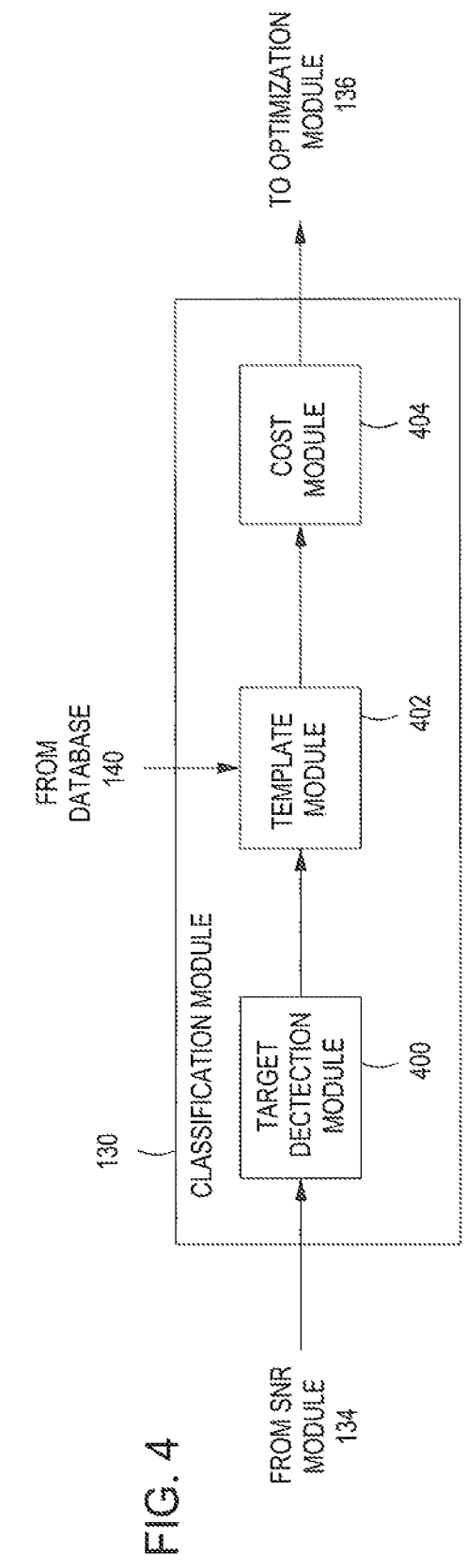
FIG. 4 is a more detailed depiction of the classification module of FIG. 1, in accordance with exemplary embodiments of the present invention.

FIG. 4 is a more detailed depiction of the classification module 130 in accordance with exemplary embodiments of the present invention. The inputs to the detector are SNR estimates from the SNR module 134. The SNR estimates are harmonic and/or intermodulation distortion products. A target detection module 400 determines the likelihood of detection for each feature of the SNR estimates. The target detection module may employ target matching methodologies such as match filter, Bayesian decision theory, Generalized Likelihood Ratio Text (GLRT), and constant false alarm rate (CFAR) processing, among others known to those of ordinary skill in the art.

Once the likelihood of the features is accessed, a template module 402, coupled to database 140, classifies the feature to identify a target type based on templates stored in database 140. Common classification methodologies include Bayesian discriminate functions, nearest neighbor classifiers, support vector machines (SVM), neural networks, tree based algorithms, and unsupervised learning algorithms. Finally, the cost module 404 assigns costs to frequencies based on the classification label from the template module 402.

For example, consider the situation where "Target 1 " is identified by the classifier with medium likelihood, i.e., there is a medium likelihood that the waveforms of the signals received by the passive receivers 106 matches waveforms stored in database 140. The objective of the classification module is to achieve a "high" likelihood of Target 1. According to one embodiment, the likelihood of Target 1 may be increased by transmitting frequencies in bands where Target 1 is known to respond. The cost module 404 therefore assigns low costs to Target I transmit frequencies and high costs to target transmit frequencies that do not include Target 1. The cost information is provided to the optimization module 136.

After target detection and classification by the classification module 130, the optimization module 136 is used to determine parameters of a new transmit frequency and other waveform parameters based on the frequency cost information determined by the cost module 404, permissible transmit frequencies provided by the database, and available transmit frequencies provided by the spectrum sensing module 132.

The optimization module 136 must minimize multiple objective functions that are non-commensurable. The formulation of the multi-objective optimization problem is as follows: for a given decision variable vector $\bar{x}=\{\bar{x}_1, \bar{x}_2, \bar{x}_3, \ldots \bar{x}_M\}$ in the solution space X, the optimizer must find a vector $\bar{x}*$ that minimizes a set of k objective functions $z(\bar{x}*)=\{z_1(\bar{x}*), \ldots z_k(\bar{x}*)\}$. Objective functions, as related to radar systems, include: SNR, system power consumption, frequency costs (as provided by the target detection and classification scheme), occupied bandwidth, computational complexity. The decision variables related to radar systems include: frequency, signal power, bandwidth, modulation type, and pulse repetition interval (PRI), among others.

Given multiple objective functions, the optimization problem is formulated as a multi-objective optimization problem. Solutions to multi-objective optimization problems consist of finding the Pareto optimal set, a surface of non-dominated solutions. Non-dominated solutions are determined based on their superiority to all other solutions in the solution space. The set of non-dominated solutions are optimal because the solutions are neither superior nor inferior to one another. According to one embodiment of the present invention, genetic algorithms are used to solve the multi-objective optimization problem, i.e., matching and classifying waveform responses with stored waveform patterns from database 140, in the present application.

Those of ordinary skill in the art would recognize that many different algorithms may be used in place of genetic algorithms, and genetic algorithms merely present an exemplary processing technique for determining optimal waveform parameters given interference patterns. Genetic algorithms search difference regions of the solution space in parallel allowing for complex solutions with non-convex, discontinuous, and multi-modal solution spaces. The search method used by genetic algorithms is randomized and therefore permits a rapid global solution and avoids losing potential non-optimal solutions.

The basic procedure of a genetic algorithm is described below. A set, or population, of N solutions is randomly generated. The solutions in the population are binary strings of chromosomes. The fittest chromosomes in the population are identified using a fitness measure, which is dependent on the objective functions. Crossover is then used to mix (or mate) two chromosomes by splitting each chromosome at a random point: then attaching the end of one chromosome to the end of the other chromosome. Mutation is then used to switch a bit in the chromosome at a random location. A new population, i.e. the next generation, is formed after the crossover and mutation process. The chromosomes in the new population are evaluated for fitness and non-dominated solutions are identified, if any exist. A stopping criterion is finally evaluated to determine if the new population meets the requirements of the optimization process.

FIG. 5 depicts a method 500 for cognitive non-linear radar processing in accordance with exemplary embodiments of the present invention, The method 500 represents an exemplary processing flow of the cognitive processing module 128 in the CNR 100 of FIG. 1. The method begins at step 502 and proceeds to step 504.

At step 504. the method identifies frequency bands and sub-bands of interest in the RF spectrum. In some instances, the bands of interest may be supplied from the database 140. In other instances, users of the apparatus 100 may manually indicate which frequency bands of interest and sub-bands of interest are to be used by the method 500.

The method proceeds to step 506 where the passive receivers 106 passively scan the one or more sub-bands of interest to determine if there is any interference present on those sub-bands. For example, if there are linear targets that respond to radar signals transmitted at the one or more sub-bands of interest, the receivers 106 will receive the responses and determine that a particular sub-band of interest is not available for transmitting or receiving because of these pre-existing signals. The target may be interference from another RF system, a non-linear target such as electromagnetic clutter from metallic and electronic objects and components or other interfering objects. Once all of the interference has been identified in the sub-bands of interest, the method proceeds to step 507.

At step 507, the CNR 10 transmits waveforms in the non-interfering sub-bands of interest from the transmitter 108 and receives response waveforms at the receiver 102. The transmitted waveforms are waveforms of known objects of interest and targets of interest stored in database 140. At step 508, the cognitive processing module 128 determines whether the waveforms at either harmonic frequencies of the original transmitting frequency, or other types of response frequencies, match the waveforms stored in the database 140.

According to exemplary embodiments, the waveform matches are determined using well known target detection and classification algorithms. For example, signal to noise ratios of the received responses are estimated by the SNR module 134 using features of the response extracted by the feature module 138. The amplitude (and other parameters) of the harmonics generated by a target is used along with the SNR estimates to classify the features of the response using the classification module 130 and classify targets of interest.

At step 510, if the response waveforms matched the known stored waveforms of interfering objects, i.e., non-linearities, parameters of the transmitted waveforms are modified by the optimization module 136. In some embodiments, the modified parameters comprise one or more of frequency, amplitude, phase or the like. The method then retreats to step 506, essentially repeating steps 506 through 510 until signal to noise ratio is increased to a predetermined threshold and the CNR 100 has determined one or more frequency sub-bands of interest to transmit over freely (that is, without interference). At step 511, if it is determined whether or not a target is present with a confidence greater than a predetermined threshold confidence, the method terminates at step 512. In other instances, the method of 500 re-iterates.

The foregoing description, purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A method for cognitive non-linear radar processing comprising:
   identifying one or more frequency bands of interest;
   passively scanning, using a non-linear radar (NR), the one or more frequency bands of interest to determine whether interference signals are occupying the one or more bands;
   transmitting radar waveforms and receiving radar waveform responses in one or more frequency bands determined to be free of interference;
   determining a likelihood of a target being present or not based on whether the received waveform responses match stored waveform responses for non-linear targets; and
   modifying waveform parameters of the transmitted radar waveform when the received waveform responses match the stored waveform responses, so as to transmit a modified radar waveform.

2. The method of claim 1 further comprising:
   repeating passively scanning the one or more frequency bands of interest and transmitting modified radar waveforms until received waveforms do not match responses for non-linear targets.

3. The method of claim 1 wherein modifying the waveform parameters comprise:
    modifying one or more of frequency, amplitude, and phase of the transmitted radar waveform.
4. The method of claim 1 further comprising:
    receiving harmonic responses in response to the transmitted radar waveforms identifying non-linear targets.
5. The method of claim 1 further comprising:
    receiving intermodulation distortion product responses in response to the transmitted radar waveforms identifying non-linear targets.
6. The method of claim 1 wherein determining whether the received waveform responses match the stored waveform responses further comprises:
    measuring the likelihood that a target is present and determining that a target is present or not present based on a comparison between the likelihood and a predetermined threshold value.
7. The method of claim 6 further comprising:
    determining a signal to noise ratio (SNR) estimate for each of the received waveform responses; and
    determining the likelihood of detection for each feature of the SNR estimates.
8. The method of claim 7 further comprising:;
    classifying the each feature to identify a target type based on wave pattern templates.
9. The method of claim 8, wherein classifying further comprises:
    applying one or more of Bayesian discrimination functions, nearest neighbor classifying, support vector machines, neural networks, tree based algorithms and unsupervised learning methods.
10. The method of claim 9 further comprising:
    assigning a cost to a frequency associated with the classified feature;
    modifying the waveform parameters of the transmitted modified radar waveform based on the assigned cost; and
    transmitting the modified radar waveform at frequencies based on least cost to highest cost.
11. The method of claim 1 further comprising processing signals received by passively scanning, the processing further comprising:
    estimating signal to noise ratio of the received signals; and
    detecting potential communication targets and other RF signals.
12. An apparatus for cognitive non-linear radar processing comprising:
    one or more passive receivers to scan one or more frequency bands of interest to determine whether interference signals are occupying the one or more bands of interest;
    a radar transmitter to transmit radar waveforms and receiving radar waveform responses in one or more frequency bands determined to be free of interference; and
    a cognitive processing module that determines the likelihood of a target being present or not based on whether the received waveform responses match stored waveform responses for non-linear targets and modifies waveform parameters of the transmitted radar waveform when the received waveform responses match the stored waveform responses, so as to transmit a modified waveform.
13. The apparatus of claim 12 further comprising:
    wherein the cognitive processing module reiterates passively scanning the one or more frequency bands of interest until received waveforms do not match responses for non-linear targets, identifying frequency sub-bands of interest which do not contain one or more of pre-existing signals and interference.
14. The apparatus of claim 12 wherein modifying the cognitive processing module further comprises a waveform module, wherein the waveform module modified the waveform parameters, and wherein the waveform parameters comprise one or more of frequency, amplitude, and phase of the transmitted waveform.
15. The apparatus of claim 12 wherein the apparatus receives harmonic responses in response to the transmitted radar waveforms identifying non-linear targets.
16. The apparatus of claim 12 wherein the apparatus receives intermodulation distortion product responses in response to the transmitted radar waveforms identifying non-linear targets.
17. The apparatus of claim 12 further wherein the cognitive processing module further comprises a classification module that determines whether the received waveform responses match the stored waveform responses further comprises:
    measuring the likelihood that a target is present and determining that a target is present or not present based on a comparison between the likelihood and a predetermined threshold value.
18. The apparatus of claim 17, wherein the cognitive processing module further comprises a signal to noise ratio module that estimates a signal to noise ratio (SNR) for each of the received waveform responses; and
    wherein the classification module further determines the likelihood of detection for each feature of the SNR estimates.
19. The apparatus of claim 18 further comprising wherein the classification module classifies the each feature to identify a target type based on wave pattern templates.
20. The apparatus of claim 19, wherein the classification module applies one or more of Bayesian discrimination functions, nearest neighbor classifying, support vector machines, neural networks, tree based algorithms and unsupervised learning methods to perform the classification.
21. The apparatus of claim 20 wherein the classification module further assigns a cost to a frequency associated with the classified feature, modifies the waveform parameters of the transmitted waveform based on the assigned cost; and transmits the modified radar waveform at frequencies based on least cost to highest cost.
22. The apparatus of claim 12 wherein the cognitive processing module further comprises a signal to noise ratio (SNR) module that estimates signal to noise ratio of the received signals and the one or more passive receivers detects potential communication targets and other RF signals.

* * * * *